US011086394B2

(12) United States Patent
Lin et al.

(10) Patent No.: US 11,086,394 B2
(45) Date of Patent: Aug. 10, 2021

(54) GAMING CABIN FOR VIRTUAL REALITY APPLICATION

(71) Applicant: ACER INCORPORATED, New Taipei (TW)

(72) Inventors: Jia-Yu Lin, New Taipei (TW); Chao-Shih Huang, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 224 days.

(21) Appl. No.: 16/513,634

(22) Filed: Jul. 16, 2019

(65) Prior Publication Data
US 2020/0164270 A1 May 28, 2020

(30) Foreign Application Priority Data

Nov. 28, 2018 (TW) .................................. 107142394

(51) Int. Cl.
*G09G 5/00* (2006.01)
*G06F 3/01* (2006.01)
(Continued)

(52) U.S. Cl.
CPC .............. *G06F 3/011* (2013.01); *A63F 13/26* (2014.09); *G06F 3/013* (2013.01); *G06F 3/016* (2013.01); *G06F 3/03547* (2013.01); *G06F 3/1423* (2013.01); *G09B 19/18* (2013.01); *H04R 1/025* (2013.01); *H04R 1/403* (2013.01); *H04R 3/12* (2013.01); *H04R 5/02* (2013.01); *H04R 5/04* (2013.01); *A63F 13/24* (2014.09); *A63F 2300/8082* (2013.01); *A63J 5/025* (2013.01); *A63J 2005/002* (2013.01);
(Continued)

(58) Field of Classification Search
CPC . G06F 3/01; G06F 3/011; G06F 3/016; G06F 3/02; G06F 3/03547; G06F 3/0543; G06F 3/1423; G06F 2203/013; A63F 13/24; A63F 13/26; A63F 13/90; A63F 2300/8082; A63J 5/025; A63J 2005/002; A63J 2005/003; A63J 2005/005; H04R 1/025; H04R 1/403; H04R 3/12; H04R 5/02; H04R 5/04; H04R 29/002; H04S 7/303; G09B 19/18; G06T 19/006
See application file for complete search history.

(56) References Cited

U.S. PATENT DOCUMENTS

4,973,042 A * 11/1990 Klopf et al. ............. A63G 1/00
 104/79
5,060,932 A * 10/1991 Yamaguchi ............ G09B 9/323
 472/47
(Continued)

*Primary Examiner* — Joe H Cheng
(74) *Attorney, Agent, or Firm* — Winston Hsu (57) ABSTRACT

A gaming cabin includes a display device, an adjustable chair, a degree-of-freedom adjusting device, a situation simulator, and a system end. The degree-of-freedom adjusting device is configured to provide three degrees of freedom for the display device along the vertical axis, along the horizontal axis and yaw, as well as provide automatic view-switching and surround sound control. The system end is configured to adjust the resolution of the display device using foveated rendering technique, thereby increasing system efficiency. The situation simulator is configured to provide visual, olfactory, tactile or impact effect during VR applications.

20 Claims, 9 Drawing Sheets

(51) Int. Cl.
  *G06F 3/0354* (2013.01)
  *G06F 3/14* (2006.01)
  *H04R 1/40* (2006.01)
  *H04R 1/02* (2006.01)
  *H04R 3/12* (2006.01)
  *H04R 5/02* (2006.01)
  *H04R 5/04* (2006.01)
  *A63F 13/26* (2014.01)
  *G09B 19/18* (2006.01)
  *A63F 13/24* (2014.01)
  *G06F 3/02* (2006.01)
  *G06T 19/00* (2011.01)
  *A63J 5/00* (2006.01)
  *A63J 5/02* (2006.01)

(52) U.S. Cl.
  CPC .... *A63J 2005/003* (2013.01); *A63J 2005/005* (2013.01); *A63J 2005/008* (2013.01); *G06F 3/02* (2013.01); *G06F 3/03543* (2013.01); *G06T 19/006* (2013.01); *H04R 2201/025* (2013.01)

(56) References Cited

U.S. PATENT DOCUMENTS

| | | | | | |
|---|---|---|---|---|---|
| 5,490,784 | A | * | 2/1996 | Carmein | A63B 22/02 434/29 |
| 5,954,508 | A | * | 9/1999 | Lo | G09B 9/02 434/55 |
| 6,042,382 | A | * | 3/2000 | Halfhill | A63G 1/26 434/55 |
| 8,066,576 | B2 | * | 11/2011 | Threlkel | A63G 21/04 472/47 |
| 10,073,516 | B2 | * | 9/2018 | Larsen | A63F 13/26 |
| 10,258,893 | B2 | * | 4/2019 | Freedman | A63G 31/08 |
| 10,380,907 | B2 | * | 8/2019 | Schluesselberger | G09B 9/02 |
| 2018/0304163 | A1 | * | 10/2018 | Freedman | A63G 31/16 |
| 2019/0289285 | A1 | * | 9/2019 | Nashida | H04N 13/366 |

* cited by examiner

GAMING CABIN FOR VIRTUAL REALITY APPLICATION

CROSS REFERENCE TO RELATED APPLICATION

This application claims priority of Taiwan Application No. 107142394 filed on 2018 Nov. 28.

BACKGROUND OF THE INVENTION

1. Field of the Invention

The present invention is related to a gaming cabin for VR application, and more particularly, to a gaming cabin for VR application which provides multiple degrees of freedom in display, automatic view-switching, automatic surround sound control, and situation simulation.

2. Description of the Prior Art

Virtual reality (VR) is an interactive computer-generated experience taking place within a simulated environment, that incorporates mainly auditory and visual, but also other types of sensory feedback like haptic. VR technologies provide a user wearing special display equipment with an immersive environment similar to the real world and allow the user to interact with a VR object or other users.

Since VR applications emphasize immersion into virtual reality, it is important to create the perception of being physically present in a non-physical world by surrounding the user in images, sound or other stimuli that provide an engrossing total environment.

SUMMARY OF THE INVENTION

The present invention provides a gaming cabin for a VR application which includes a display device, an adjustable chair disposed on a stand base, a degree-of-freedom adjusting device, and a system end. The degree-of-freedom adjusting device includes a plurality of vertical tracks disposed on the stand base, a plurality of annular tracks disposed on the plurality of vertical tracks in a movable manner and configured to provide a first degree of freedom along a vertical direction by moving upwards or downwards along the plurality of vertical tracks and provide a second degree of freedom along a horizontal direction by rotating along the plurality of vertical tracks, an eye-gaze detector disposed on a first annular track among the plurality of annular tracks and configured to provide an eye-gaze data by detecting a sightline variation and a head angle of a user when sitting on the adjustable chair, and a display adjusting device disposed on a second annular track among the plurality of annular tracks and configured to accommodate the display device and provide a third degree of freedom associated with an inclination angle of the display device. The system end includes a host configured to provide an audio/video data required to run the VR application, and a micro controller configured to adjust an orientation angle and an inclination angle of the adjustable chair, control the plurality of annular tracks to move upwards or downwards along the plurality of vertical tracks to adjust a height of the display device, and control the plurality of annular tracks to rotate along the plurality of vertical tracks to adjust an orientation angle of the display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
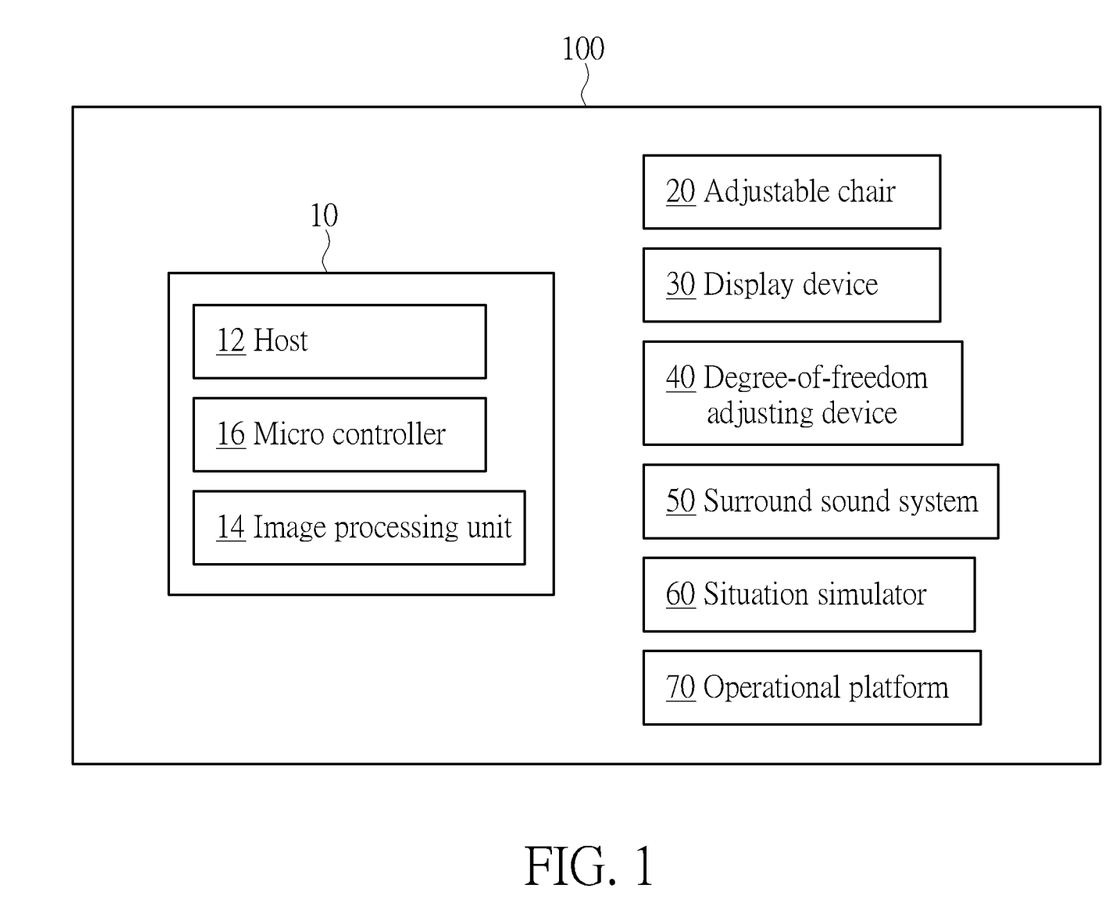
FIG. 1 is a functional diagram illustrating a gaming cabin for VR application according to an embodiment of the present invention.

FIG. 1 is a functional diagram illustrating a gaming cabin 100 for VR application according to an embodiment of the present invention. The gaming cabin 100 includes a system end 10, an adjustable chair 20, a display device 30, a degree-of-freedom adjusting device 40, a surround sound system 50, a situation simulator 60, and an operational platform 70.

The system end 10 includes a host 12, an image processing unit 14 and a micro controller 16. The host 12 is configured to provide the audio/video data for running various VR applications. The image processing unit 14 is configured to process the audio/video data received from the host 12 for presentation on the display device 30. The micro controller 16 is configured to operate each device of the game cabin 100 according to the audio/video data provided by the host 12 for providing corresponding visual, olfactory, tactile or impact VR effect. In an embodiment of the present invention, the system end 10 may be disposed on any location in the gaming cabin 10 as long as it does not interfere with the process of VR applications. However, the implementation of the system end 10 does not limit the scope of the present invention.

Figure 2A:
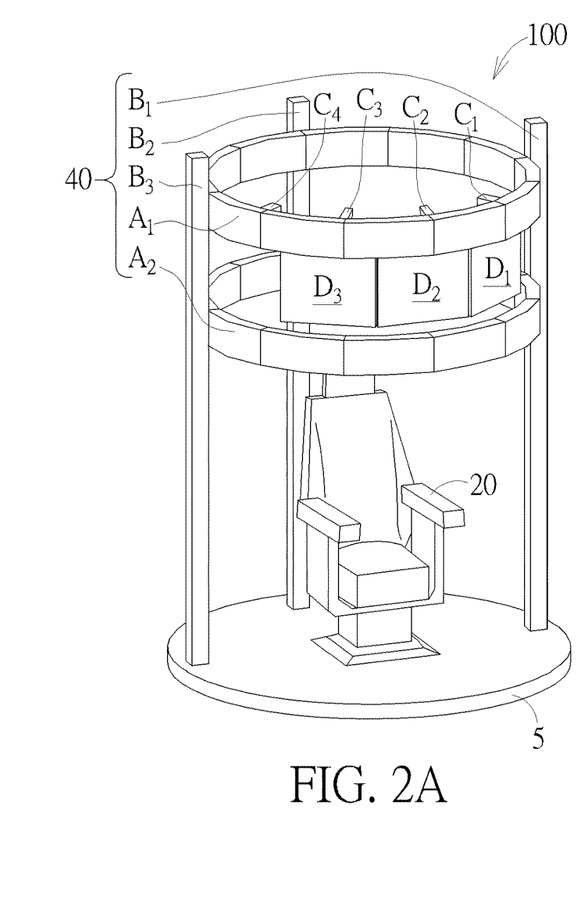
FIGS. 2A~2C are diagrams illustrating an implementation of an adjustable chair, a display device, and a degree-of-freedom adjusting device in the gaming cabin according to an embodiment of the present invention.
Figure 2B:
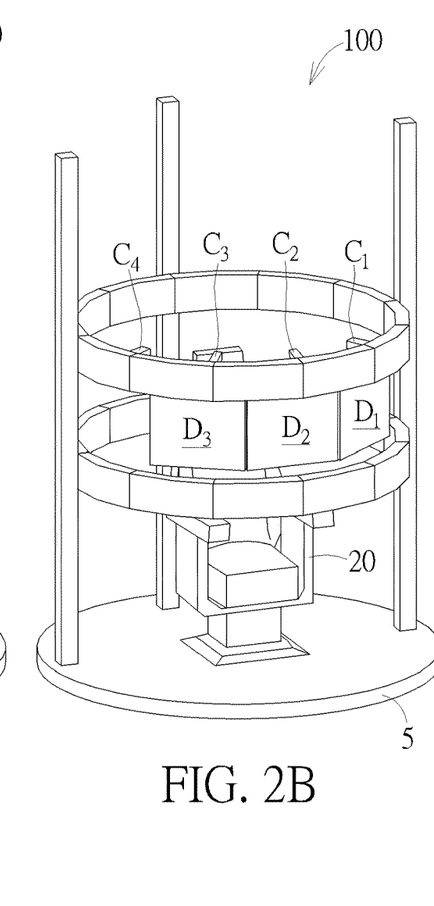
Figure 2C:
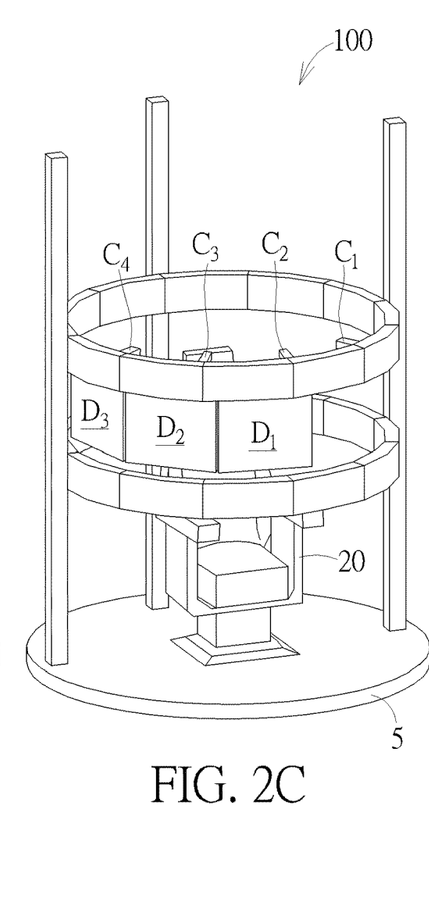

FIGS. 2A~2C are diagrams illustrating an implementation of the adjustable chair 20, the display device 30, and the degree-of-freedom adjusting device 40 in the gaming cabin 100 according to an embodiment of the present invention.

The adjustable chair 20 may be disposed on a stand base 5. The micro controller 16 (not shown in FIGS. 2A~2C) may operate a rotating motor 22 and inclination controller 24 (which may be disposed inside the adjustable chair 20) of the adjustable chair 20 according to the VR audio/video data provided by the host 12 (not shown in FIGS. 2A~2C), thereby adjusting the orientation angle and the inclination angle of the adjustable chair 20 during VR applications. The degree-of-freedom adjusting device 40 includes annular tracks $A_1$~$A_M$, vertical tracks $B_1$~$B_N$, eye-gaze detectors $C_1$~$C_P$, and a display adjusting device 44, wherein M, N and P are integers larger than 1. The vertical tracks $B_1$~$B_N$ are fixed to the stand base 5 for accommodating the annular tracks $A_1$~$A_M$. The annular tracks $A_1$~$A_M$ are disposed on the vertical tracks $B_1$~$B_N$ in a movable manner. The annular tracks $A_1$~$A_M$ may provide a degree of freedom along the vertical direction during VR applications by moving upwards or downwards along the vertical tracks $B_1$~$B_N$, as depicted in FIG. 2A and FIG. 2B. The annular tracks $A_1$~$A_M$ may provide a degree of freedom along the horizontal direction during VR applications by rotating around the vertical tracks $B_1$~$B_N$, as depicted in FIG. 2B and FIG. 2C. The display device 30 includes $D_1$~$D_Q$ (Q is a positive integer) fixed to the display adjusting device 44, which is disposed on the annular tracks $A_1$~$A_M$ in a movable manner. Although the display adjusting device 44 is not shown in FIGS. 2A~2C due to blocked view, its implementation will be described in subsequent paragraphs and drawings. For illustrative purpose, FIGS. 2A~2C depict the embodiment when M=2, N=3, P=4 and Q=3. However, the values of M, N, P and Q do not limit the scope of the present invention.

Figure 3A:
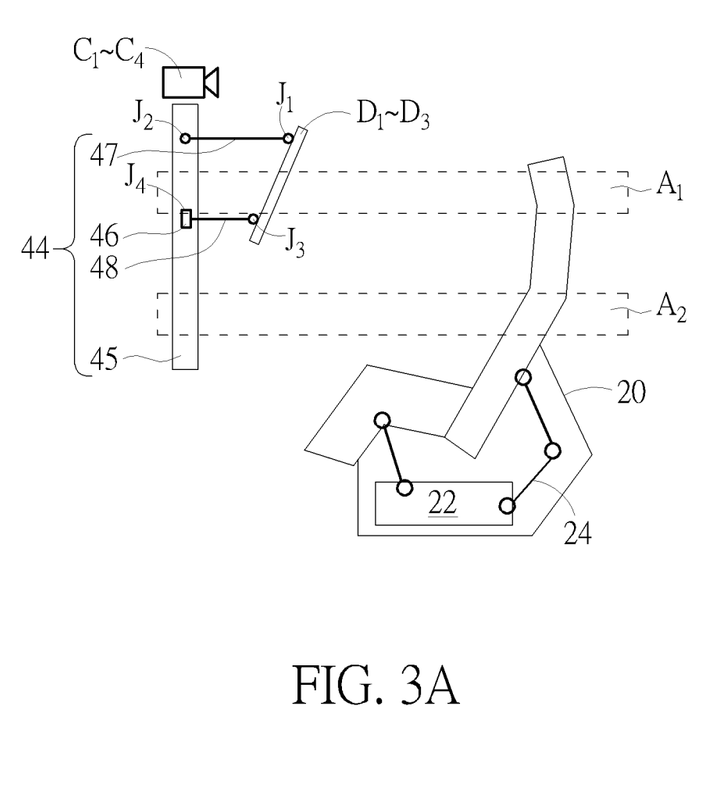
FIGS. 3A and 3B are side-view diagrams illustrating an implementation of a adjustable chair, a display device and a degree-of-freedom adjusting device in the gaming cabin according to an embodiment of the present invention.
Figure 3B:
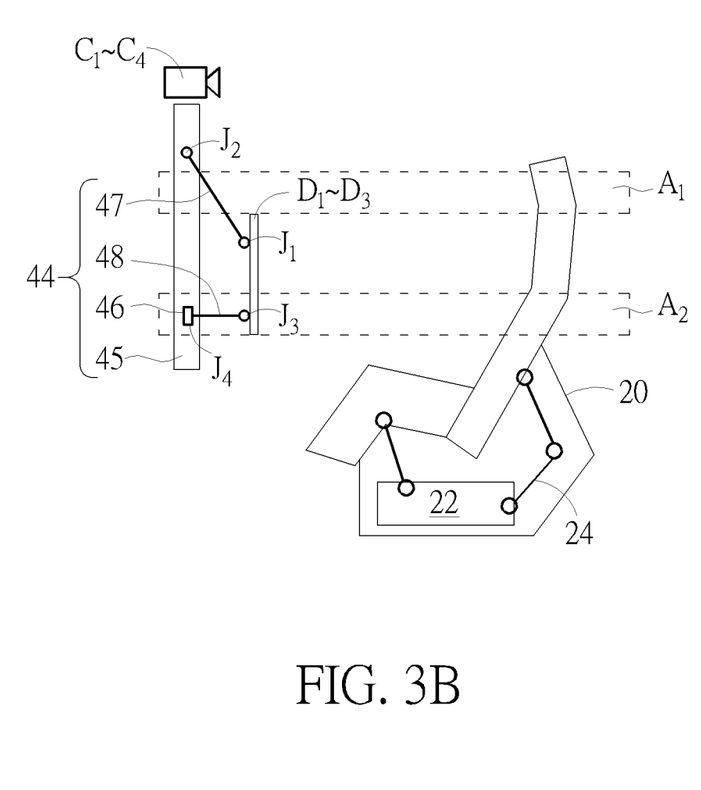

FIGS. 3A and 3B are side-view diagrams illustrating an implementation of the adjustable chair 20, the display device 30, and the degree-of-freedom adjusting device 40 in the gaming cabin 100 according to an embodiment of the present invention. In this embodiment, the display adjusting device 44 includes vertical sliding rails 45, sliding blocks 46, connecting rods 47, and linking rods 48 for controlling the operation of the screens $D_1$~$D_3$. The vertical sliding rails 45 are fixed to at least one of the annular tracks $A_1$~$A_2$, and the sliding blocks 46 may move vertically in corresponding vertical sliding rails 45. Each connecting rod 47 includes two rotatable contacts $J_1$ and $J_2$, wherein the rotatable contact $J_1$ is connected to the upper side of a corresponding screen in the display device 30 and the rotatable contact $J_2$ is connected to a corresponding vertical sliding rail 45. Each linking rod 48 includes a rotatable contact $J_3$ and an irrotatable contact $J_4$, wherein the rotatable contact $J_3$ is connected to the lower side of a corresponding screen in the display device 30 and the irrotatable contact $J_4$ is fixed to a corresponding sliding block 46. The eye-gaze detectors C1~CP may include multiple cameras or Infrared sensors which are configured to detect the sightline variation or the head angle of a user when sitting on the adjustable chair 20. Based on the eye-gaze data provided by the eye-gaze detectors $C_1$~$C_P$, the display adjusting device 44 may adjust the inclination angle of the screens $D_1$~$D_Q$ by moving the sliding blocks 46 in the vertical sliding rails 45, thereby providing a degree of freedom regarding yaw during VR applications. The present display adjusting device 44 may adopt any suitable mechanism for adjusting the inclination angle of the screens $D_1$~$D_Q$. The embodiment illustrated in FIGS. 3A and 3B does not limit the scope of the present invention.

Figure 4A:
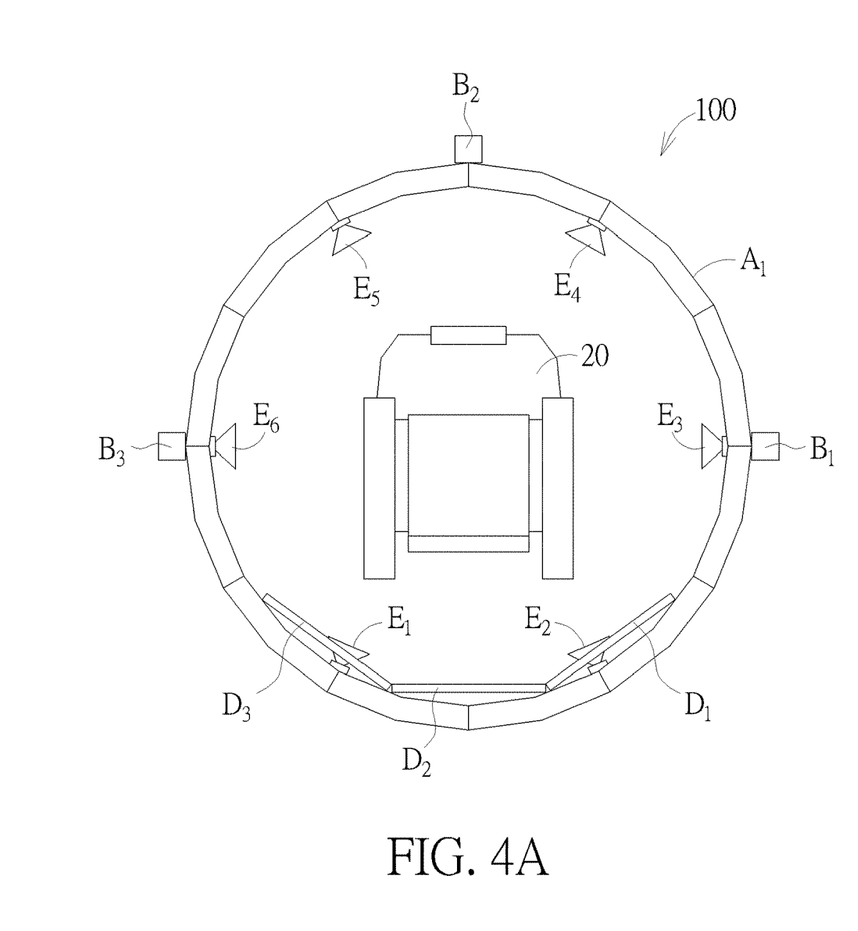
FIGS. 4A and 4B are diagrams illustrating an implementation of an adjustable chair, a display device, and a surround sound system in the gaming cabin according to an embodiment of the present invention.
Figure 4B:
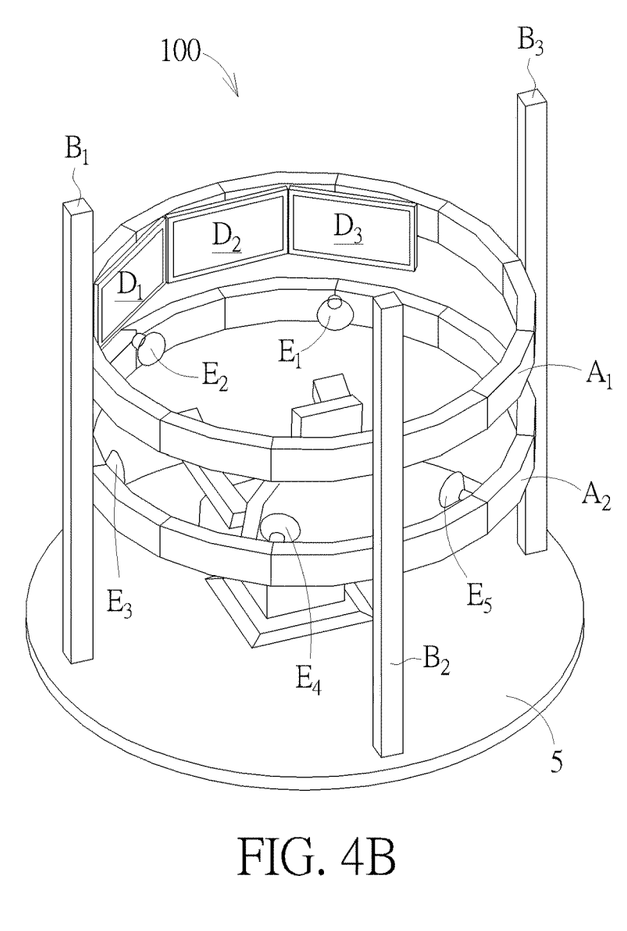

FIGS. 4A and 4B are diagrams illustrating an implementation of the adjustable chair 20, the display device 30, and the surround sound system 50 in the gaming cabin 100 according to an embodiment of the present invention. As depicted in the top-view diagram of FIG. 4A, the surround sound system 50 includes speakers $E_1$~$E_R$ (R is a positive integer) disposed on various locations of the annular tracks $A_1$~$A_M$ for providing surround sound effects. As depicted in the external diagram of FIG. 4B, the screens $D_1$~$D_Q$ in the display device 30 may be disposed on the annular track $A_1$, while the surround sound system 50 may be disposed on the annular track $A_2$. The micro controller 16 is further configured to adjust the volume and sound effect of each speaker in the surround sound system 50 according to the audio/video data provided by the host 12 so as to provide corresponding surround sound effects. For illustrative purpose, FIGS. 4A and 4B depict the embodiment when R=6. However, the number of speakers in the surround sound system 50 and the location of the surround sound system 50 on the annular track $A_1$~$A_M$ do not limit the scope of the present invention.

Figure 5A:
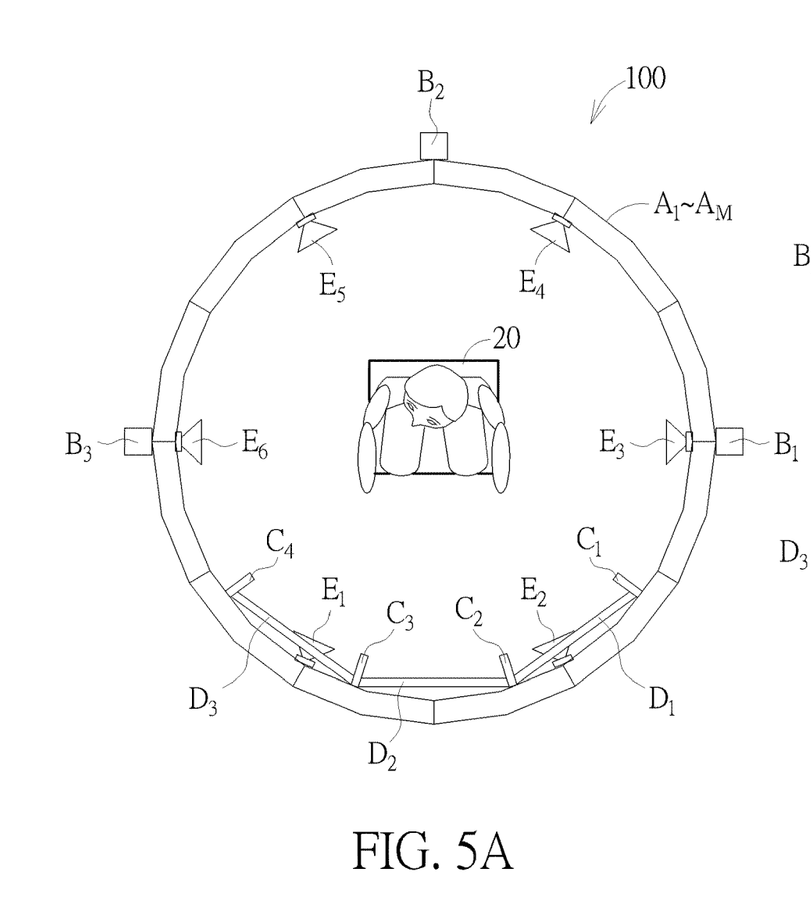
FIGS. 5A and 5B are diagrams illustrating the operation of an adjustable chair, a display device, a degree-of-freedom adjusting device, and a surround sound system in the gaming cabin according to an embodiment of the present invention.
Figure 5B:
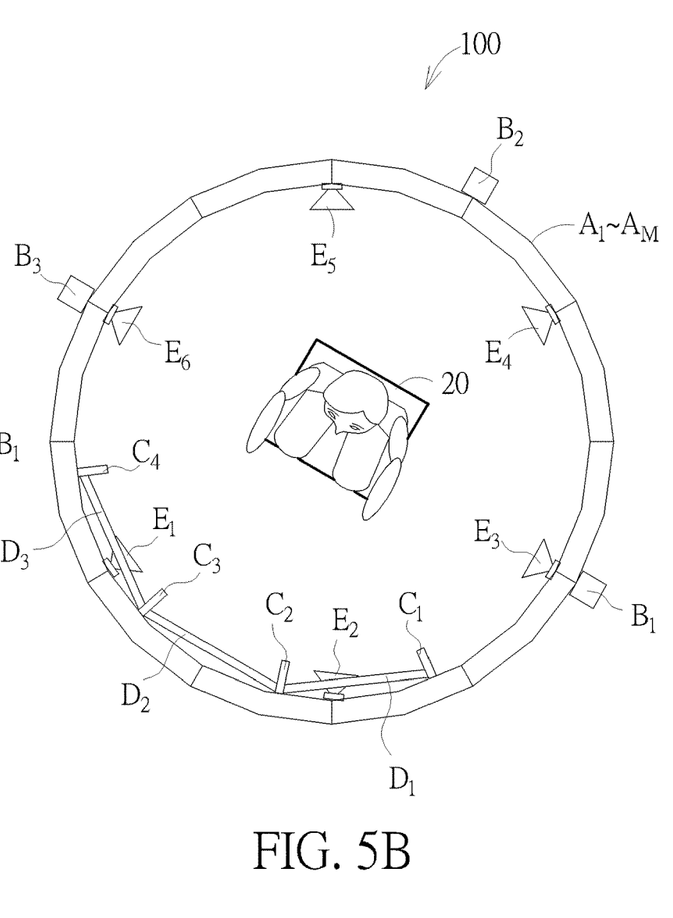

FIGS. 5A and 5B are diagrams illustrating the operation of the adjustable chair 20, the display device 30, the degree-of-freedom adjusting device 40, and the surround sound system 50 in the gaming cabin 100 according to an embodiment of the present invention. Assuming that specific audio effects need to be provided on the left side and the right side of the user according to the current content of a VR application, the speakers $E_3$ and $E_6$ in the surround sound system 50 are required to produce corresponding sounds, while the other speakers are mute. If the eye-gaze detectors $C_1$~$C_4$ determine that the user moves his eyesight from the screen $D_1$ in the front to the screen $D_3$ on the front-right as depicted in FIG. 5A, the micro controller 16 of the system end 10 (not shown in FIGS. 5A and 5B) is configured to control the annular tracks $A_1$~$A_M$ to rotate clockwise so that the screens $D_1$~$D_3$ and the speakers $E_1$~$E_5$ disposed on the annular tracks $A_1$~$A_M$ can move in accordance with the eyesight of the user (as depicted in FIG. 5B), thereby allowing the speakers $E_3$ and $E_6$ in the surround sound system 50 to continue producing corresponding audio effects on the left side and the right side of the user. Meanwhile, the adjustable chair 20 may adjust the body orientation of the user using a rotatory motor 22 as depicted in FIGS. 3A and 3B. By controlling the adjustable chair 20, the display device 30 and the surround sound system 50 to move in accordance with the eyesight of the user, the user is not required to manually switch between multiple perspectives, and the surround sound effect can be maintained regardless of the body orientation of the user.

Figure 6A:
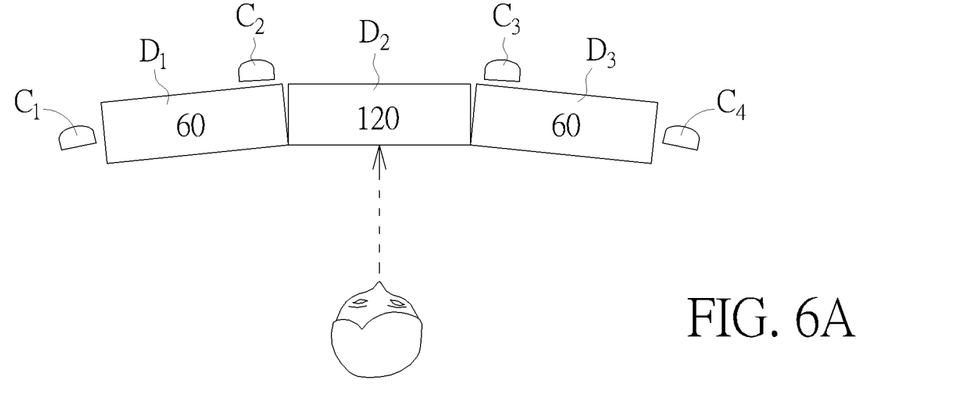
FIGS. 6A~6C are diagrams illustrating a foveated rendering operation of a display device according to an embodiment of the present invention.
Figure 6B:
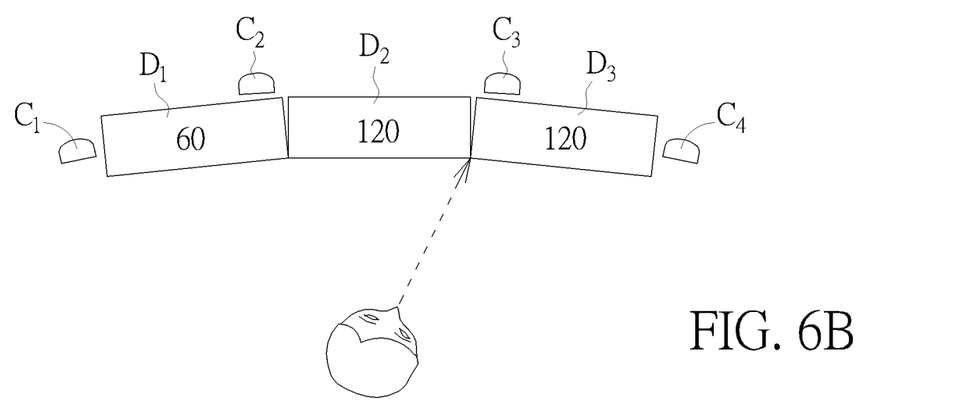
Figure 6C:
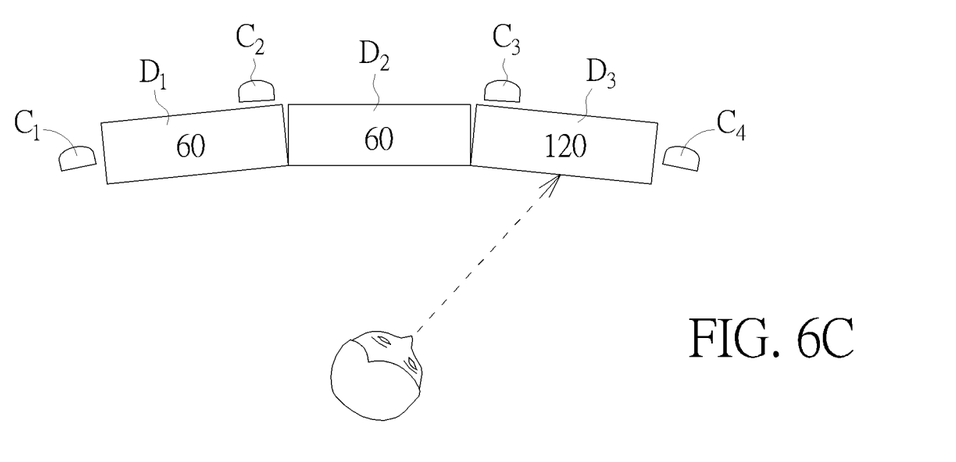

Different visual areas contribute to the processing of visual information coming from different parts of the visual field, wherein visual detail of the central vision is of primary importance and the peripheral vision occurs only on the side gaze. When recognizing an object in the peripheral vision, a person customarily turns his head towards to the object in order to use the central vision. In addition to the above-mentioned method to move the display device 30 in accordance with the eyesight of the user, the present invention may further employ foveated rendering technique to reduce the rendering workload or hardware demand by greatly reducing the image quality in the peripheral vision. FIGS. 6A~6C are diagrams illustrating the foveated rendering operation of the display device 30 according to an embodiment of the present invention. FIGS. 6A—6C sequentially depict the process when the user moves his eyesight from the screen $D_2$ to the screen $D_3$, wherein the numbers shown on the screens $D_1$~$D_3$ represent the corresponding resolution of each screen as the user moves his eyesight. In the state depicted in FIG. 6A when the eye-gaze detectors $C_1$~$C_4$ determine that the user gazes straight ahead, the screen $D_1$ in the central vision may adopt a higher resolution, while the screens $D_2$~$D_3$ in the peripheral vision may adopt lower resolutions. In the state depicted in FIG. 6B when the eye-gaze detectors $C_1$~$C_4$ determine that the user now gazes at a point roughly between the screen $D_2$ and the screen $D_3$, the screens $D_2$~$D_3$ in the central vision may adopt higher resolutions, while the screen $D_1$ in the peripheral vision may adopt a lower resolution. In the state depicted in FIG. 6C when the eye-gaze detectors $C_1$~$C_4$ determine that the user now gazes at the screen $D_3$, the screen $D_3$ in the central vision may adopt a higher resolution, while the screens $D_1$~$D_2$ in the peripheral vision may adopt lower resolutions.

Figure 7:
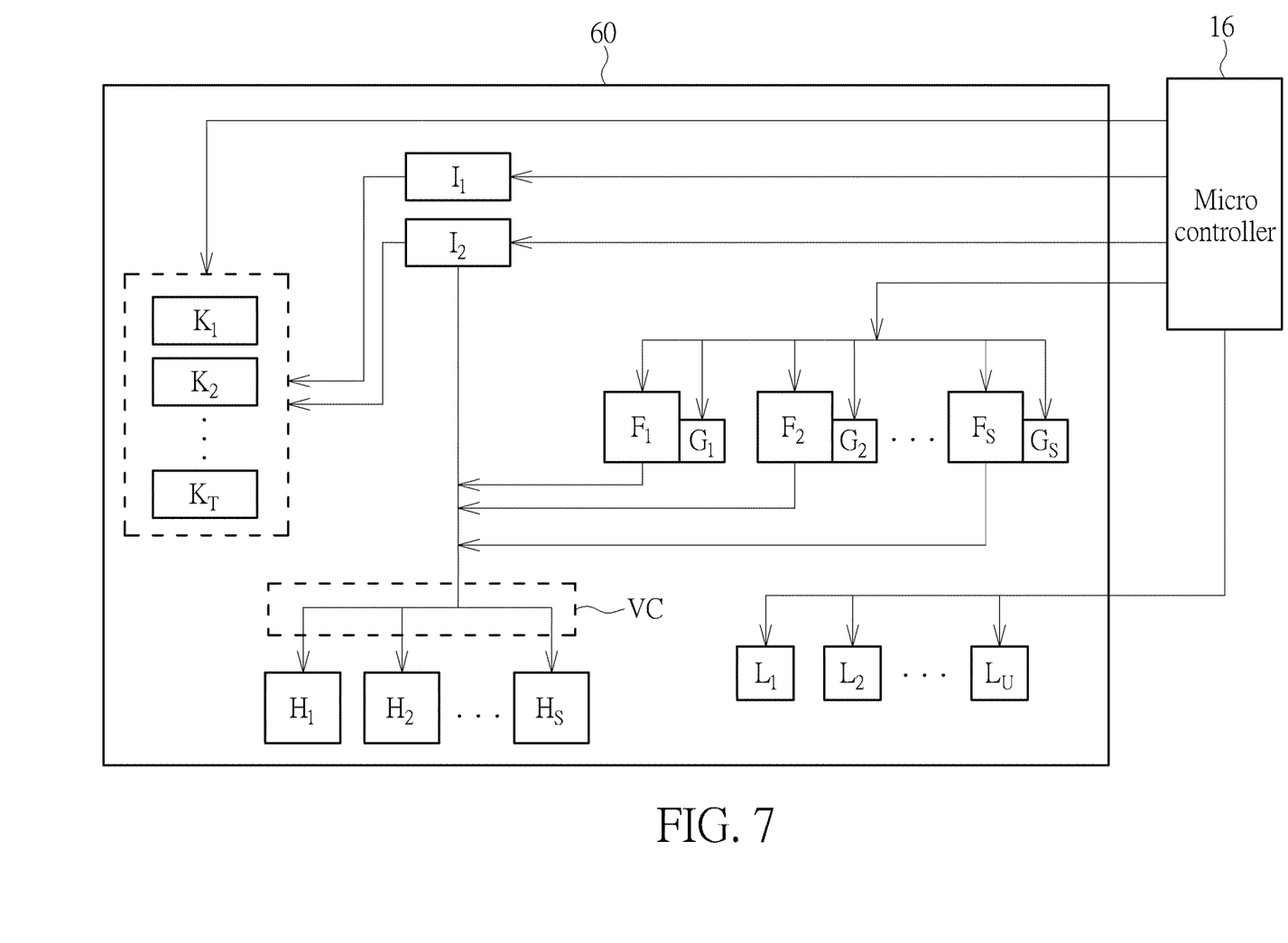
FIG. 7 is a functional diagram illustrating a situation simulator according to an embodiment of the present invention.

FIG. 7 is a functional diagram illustrating the situation simulator 60 according to an embodiment of the present invention. The situation simulator 60 includes tanks $F_1$~$F_S$, heaters $G_1$~$G_S$, nozzles $H_1$~$H_S$, pumps $H_1$~$H_2$, airbags $K_1$~$K_T$, fans $L_1$~$L_U$, and a valve controller VC, wherein S, T and U are positive integers. The tanks $F_1$~$F_S$ may contain various substances including, but not limited to, solid carbon dioxide, propylene glycol, vegetable glycerin or flavoring essence. The heaters $G_1$~$G_S$ may be used to elevate the temperature of the tanks $F_1$~$F_S$, respectively. The nozzles $H_1$~$H_S$ are respectively connected to the tanks $F_1$~$F_S$ via corresponding pipelines which may be turned on or off by the valve controller VC as instructed by the micro controller 16.

When the situation simulator 60 is required to provide visual effects, the micro controller 16 may instruct the heaters $G_1$~$G_S$ to elevate the temperature of the tanks $F_1$~$F_S$ containing solid carbon dioxide, propylene glycol or vegetable glycerin, thereby resulting in phase transition for creating smokes. With the pumps $H_1$~$H_2$ providing the air pressure for gas ejection, visual effects required during the VR application may be provided by turning on corresponding nozzles to create smokes inside the gaming cabin 100.

When the situation simulator 60 is required to provide olfactory effects, the micro controller 16 may instruct the pumps $H_1$~$H_2$ to provide the air pressure to the tanks $F_1$~$F_S$ containing various types of flavoring essence, thereby ejecting gas that smells like gunfire, forest, blood or sea water. Olfactory effects required during the VR application may be provided by turning on corresponding nozzles to release gas of various smells inside the gaming cabin 100.

When the situation simulator 60 is required to provide tactile effects, the micro controller 16 may instruct the pumps $H_1$~$H_2$ to create high-speed air blast which feels like grazed by a bullet or instruct the fans $L_1$~$L_U$ to create air circulation which feels like natural winds, thereby providing tactile effects required during the VR application.

The airbags $K_1$~$K_T$ may be disposed on various location inside the adjustable chair 30, such as at locations corresponding to the left back, the right back, the left waist, the right waist, the left thigh, the right thigh, the left calf, or the right calf of the user. When the situation simulator 60 is required to provide impact effects, the micro controller 16 may instruct the pumps $H_1$~$H_2$ to inflate or deflate corresponding airbags, thereby providing impact effects on various parts of the user required during the VR application.

Figure 8A:
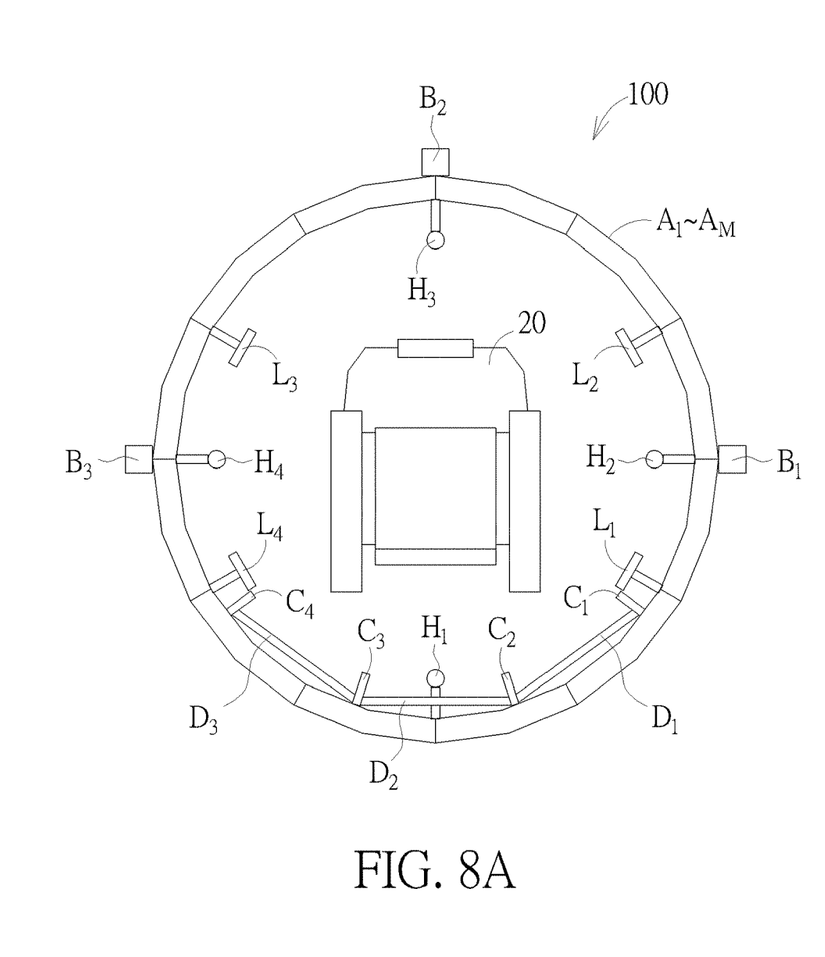
FIGS. 8A and 8B are diagrams illustrating the implementation of an adjustable chair, a display device and a situation simulator in the gaming cabin according to an embodiment of the present invention.
Figure 8B:
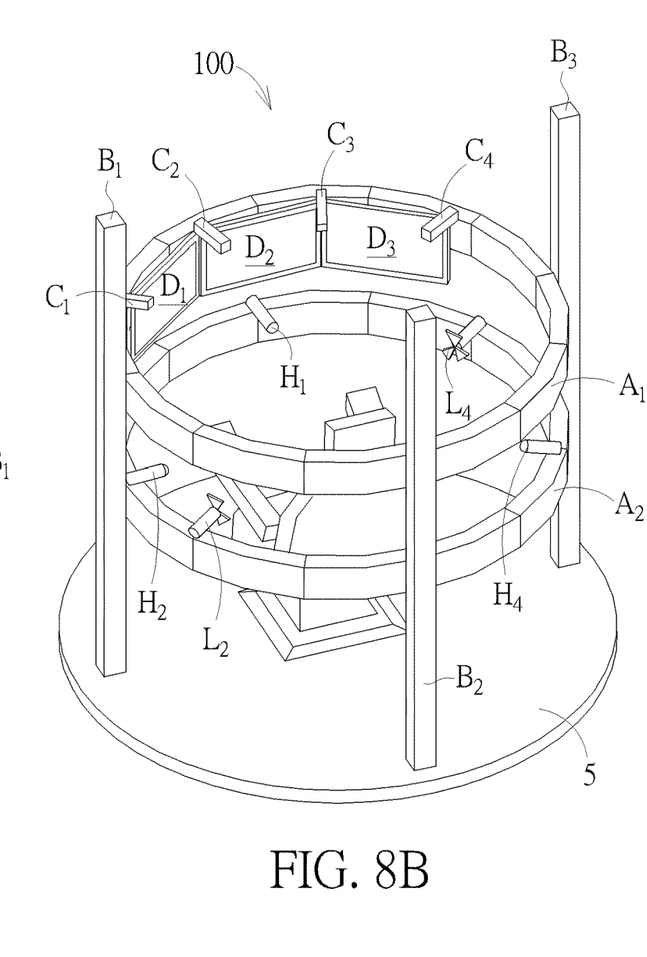

FIGS. 8A and 8B are diagrams illustrating the implementation of the adjustable chair 20, the display device 30 and the situation simulator 60 in the gaming cabin 100 according to an embodiment of the present invention. As depicted in the top-view diagram of FIG. 8A, the situation simulator 60 may be disposed on various locations of the annular tracks $A_1$~$A_M$ to provide various VR effects. As depicted in the external diagram of FIG. 8B, the screens $D_1$~$D_Q$ of the display device 30 may be disposed on the annular track $A_1$ and the nozzles $H_1$~$H_S$ and the fans $L_1$~$L_U$ of the situation simulator 60 may be disposed on the annular track $A_2$. The micro controller 16 may control the situation simulator 60 to provide visual, olfactory, tactile or impact VR effect according to the VR video/audio data provided by the host 12. For illustrative purpose, FIGS. 8A and 8B depict the embodiment when Q=3, S=4 and U=4. However, the amount of the nozzles and fans in the situation simulator 60 and the location of the situation simulator 60 do not limit the scope of the present invention.

Figure 9:
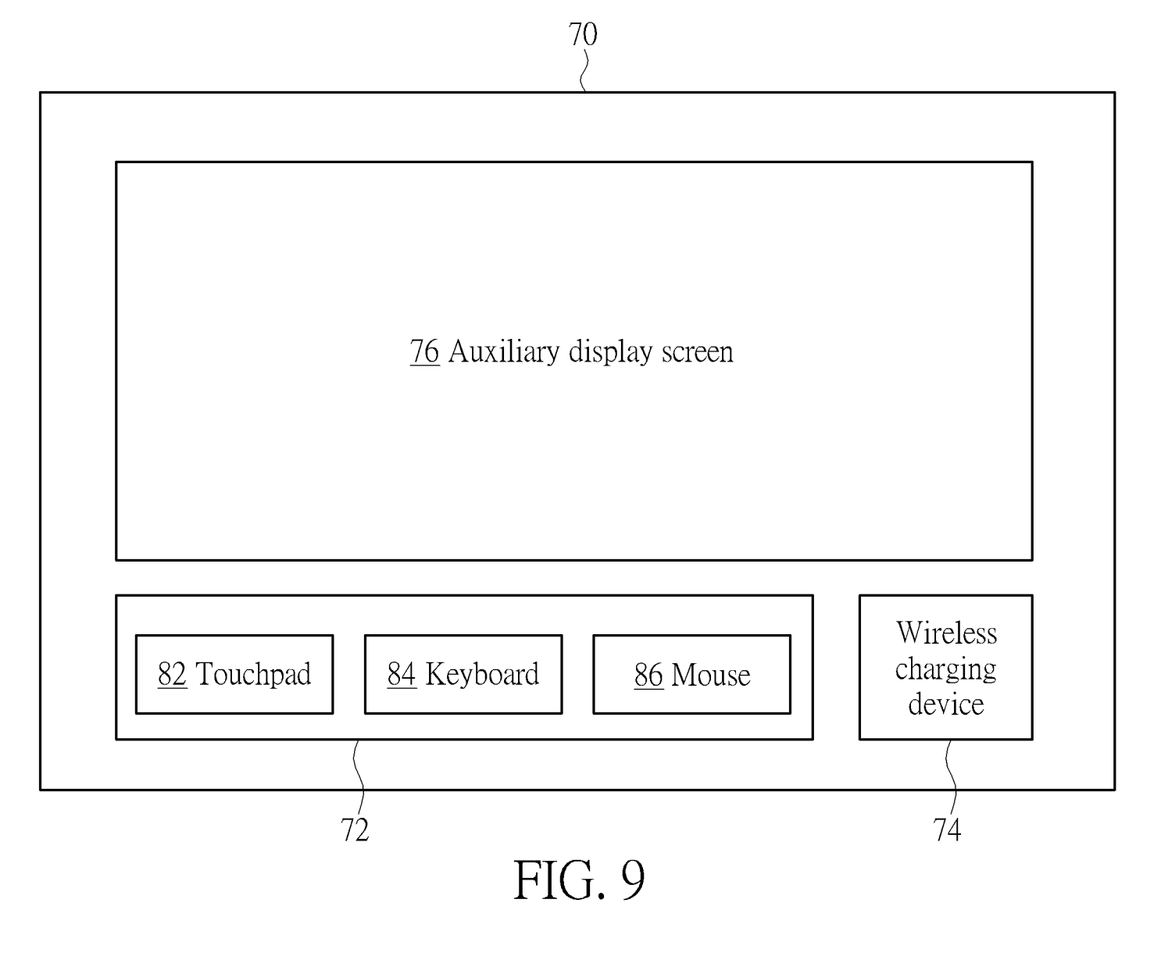
FIG. 9 is a top-view diagram illustrating the configuration of an operational platform in the gaming cabin according to an embodiment of the present invention.

In an embodiment of the present invention, the operational platform 70 may be disposed in front of the adjustable chair 20 in order to provide the user with a control interface during the VR application. FIG. 9 is a top-view diagram illustrating the configuration of the operational platform 70 in the gaming cabin 100 according to an embodiment of the present invention. The operational platform 70 includes an input/output interface 72, a wireless charging device 74, and an auxiliary display screen 76. The input/output interface 72 includes a touchpad 82, a keyboard 84, and a mouse 86. The user may set the initial environment before running an VR application using the touchpad 82, such as adjusting the height and angle of the adjustable chair 20 and the display device 30, or setting the degree of situation simulation (turning on or turning off certain effects). The user may issue various commands during the VR application using the keyboard 84 and the mouse 86. The keyboard 84 and the mouse 86 may be external devices, or implemented as internal devices which are integrated into the surface of the operational platform 70. The keyboard 84 may be a physical keyboard, or a virtual touch keyboard which is implemented on the surface of the operational platform 70. However, the implementation of the input/output interface 72 does not limit the scope of the present invention.

The wireless charging device 74 and the auxiliary display screen 76 may be connected to the system end 10 using Bluetooth or a wireless projection technology. The wireless charging device 74 allows the user to charge his mobile device during the VR application. The auxiliary display screen 76 may display system information, such as showing the activation or deactivation of each function. After receiving a corresponding command, the auxiliary display screen 76 may switch to show a wireless projection area. With the speakers $E_1$~$E_R$ of the surround sound system 50 and the eye-gaze detectors $C_1$~$C_P$ of the degree-of-freedom adjusting device 40, the user in the adjustable chair 20 may use another mobile device to make video calls or VR live broadcasts on the wireless projection area. In the embodiment of the present invention, the wireless projection technology adopted by the wireless charging device 74 and the auxiliary display screen 76 to be connected to the system end 10 may include Airplay, Intel WIDII, MiraCast or ChromeCast, but does not the scope of the present invention.

In the gaming cabin of the present invention, a degree-of-freedom adjusting device is used to provide 3 degrees of freedom in vertical direction, horizontal direction and yaw. Automatic view switching and surround sound control may be achieved according to the eye-gaze data provided by eye-gaze detectors. The present gaming cabin further employs foveated rendering technique to reduce the rendering workload or hardware demand, as well as a situation simulator which provides visual, olfactory, tactile or impact VR effect required during VR applications.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A gaming cabin for a virtual reality (VR) application, comprising:
   a display device;
   an adjustable chair disposed on a stand base;
   a degree-of-freedom adjusting device, comprising:
      a plurality of vertical tracks disposed on the stand base;
      a plurality of annular tracks disposed on the plurality of vertical tracks in a movable manner and configured to:
         provide a first degree of freedom along a vertical direction by moving upwards or downwards along the plurality of vertical tracks; and
         provide a second degree of freedom along a horizontal direction by rotating along the plurality of vertical tracks;
      an eye-gaze detector disposed on a first annular track among the plurality of annular tracks and configured to provide an eye-gaze data by detecting a sightline variation and a head angle of a user when sitting on the adjustable chair; and
      a display adjusting device disposed on a second annular track among the plurality of annular tracks and configured to accommodate the display device and provide a third degree of freedom associated with an inclination angle of the display device; and
   a system end, comprising:
      a host configured to provide an audio/video data required to run the VR application; and
      a micro controller configured to adjust an orientation angle and an inclination angle of the adjustable chair, control the plurality of annular tracks to move upwards or downwards along the plurality of vertical tracks to adjust a height of the display device, and control the plurality of annular tracks to rotate along the plurality of vertical tracks to adjust an orientation angle of the display device.

2. The gaming cabin of claim 1, wherein the display adjusting device comprises:
   a vertical sliding rail fixed to the second annular track;
   a sliding block arranged to move in the sliding rail;
   a connecting rod including a first rotatable contact connected to an upper side of a screen in the display device and a second rotatable contact connected to the vertical sliding rail; and
   a linking rod including a third rotatable contact connected to a lower side of the screen and an irrotatable contact fixed to the sliding block.

3. The gaming cabin of claim 2, wherein the micro controller is further configured to control a movement of the sliding block in the vertical sliding rail according to the audio/video data or according to the eye-gaze data so as to adjust an inclination angle of the screen.

4. The gaming cabin of claim 1, further comprising:
   a surround sound system including a plurality of speakers disposed on a third annular track among the plurality of annular tracks, wherein the micro controller is further configured to control a rotation of third annular track along the plurality of vertical tracks according to the audio/video data or according to the eye-gaze data so as to adjust an orientation angle of the plurality of speakers.

5. The gaming cabin of claim 4, wherein:
   when the micro controller determines that an audio effect needs to be provided on a first side of the user according to the audio/video data or according to the eye-gaze data, a first speaker among the plurality of speakers is configured to produce a corresponding sound; and
   the first speaker is disposed on the third annular track at a location corresponding to the first side of the user.

6. The gaming cabin of claim 5, wherein:
   when the micro controller determines that no audio effect needs to be provided on a second side of the user according to the audio/video data or according to the eye-gaze data, a second speaker among the plurality of speakers is mute; and
   the second speaker is disposed on the third annular track at a location corresponding to the second side of the user.

7. The gaming cabin of claim 1, further comprising:
   a situation simulator disposed on a fourth annular track among the plurality of annular tracks and including a plurality of nozzles for ejecting gas of distinct colors so as to provide a visual effect required during the VR application.

8. The gaming cabin of claim 7, wherein the gas of distinct colors includes solid carbon dioxide, propylene glycol and/or vegetable glycerin.

9. The gaming cabin of claim 1, further comprising:
   a situation simulator disposed on a fourth annular track among the plurality of annular tracks and including a plurality of nozzles for ejecting gas of distinct odors so as to provide an olfactory effect required during the VR application.

10. The gaming cabin of claim 9, wherein the gas of distinct odors includes various types of flavoring essence.

11. The gaming cabin of claim 1, further comprising:
    a situation simulator disposed on a fourth annular track among the plurality of annular tracks and including a plurality of fans for generating winds of distinct strengths so as to provide a tactile effect required during the VR application.

12. The gaming cabin of claim 1, further comprising:
    a situation simulator disposed on a fourth annular track among the plurality of annular tracks and including a plurality of nozzles and a pump for ejecting gas of distinct strengths so as to provide a tactile effect required during the VR application.

13. The gaming cabin of claim 1, further comprising:
    a situation simulator including a plurality of airbags disposed inside the adjustable chair for providing an impact effect required during the VR application.

14. The gaming cabin of claim 1, further comprising an operational platform disposed in front of the adjustable chair for providing a control interface for the user during the VR application, the operational platform comprising:
    a wireless charging device connected to the system end using a wireless communication technology or a wireless projection technology; and
    an auxiliary display screen connected to the system end using the wireless communication technology or the wireless projection technology.

15. The gaming cabin of claim 14, wherein the auxiliary display screen is configured to display system information associated with an activation or a deactivation of each function of the game cabin.

16. The gaming cabin of claim 14, further comprising an input/output interface which allows the user to set an initial environment before running the VR application.

17. The gaming cabin of claim 16, wherein the input/output interface includes a touchpad which allows the user to set the initial environment by adjusting a height and an angle of the adjustable chair and the display device, or by adjusting the height and an angle of the display device.

18. The gaming cabin of claim 14, further comprising an input/output interface which allows the user to issue various commands during the VR application.

19. The gaming cabin of claim 18, wherein the input/output interface includes a keyboard and a mouse which allow the user to issue various commands during the VR application.

20. The gaming cabin of claim 1, wherein:
the display device includes a plurality of screens; and
the micro controller is further configured to adjust a resolution of each screen according to the eye-gaze data.

\* \* \* \* \*